2,931,122

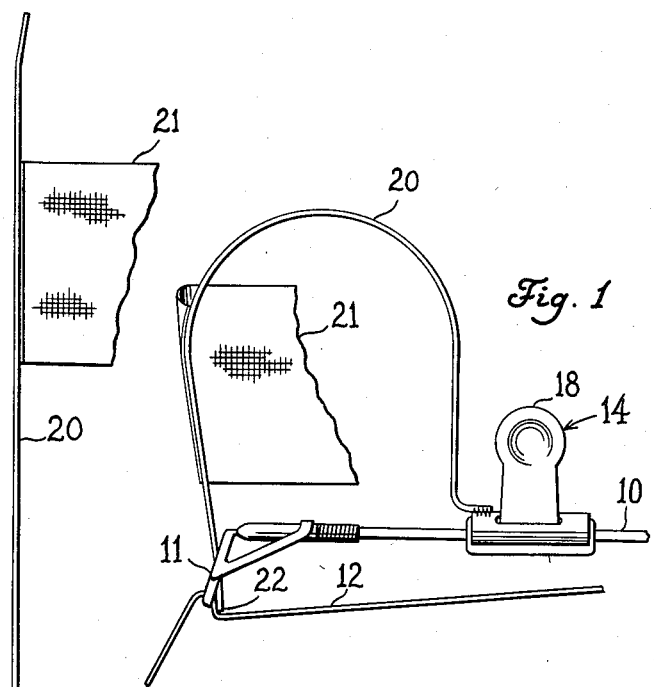
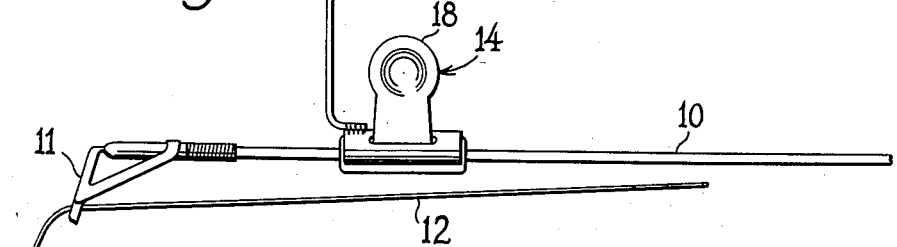
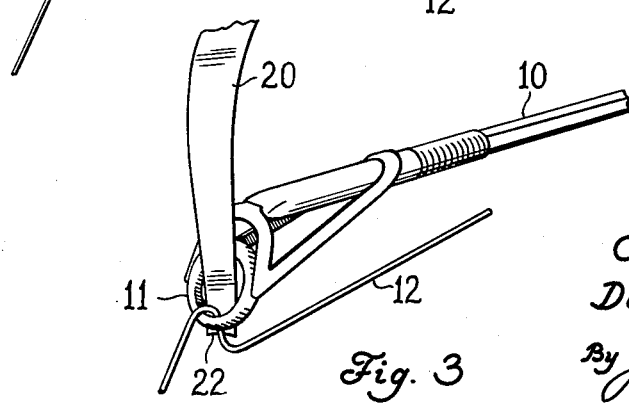

FISHING TIP-UP

Clifford Thordson and David W. Barrows, Racine, Wis.

Application July 19, 1957, Serial No. 672,980

1 Claim. (Cl. 43—17)

This invention relates to tip-up or signal devices for use in fishing. It finds particular utility for fishing through the ice and notifies the fisherman that he has a bite.

In fishing through ice with a tip-up arrangement, a free spinning reel is often preferred because once certain fish, such as trout, pan fish or others with senistive mouths, start to suck in the bait, they will be immediately spit it out if resistance is offered to the line. Once the fish takes the bait, the line should be free so that the fish can run with the bait.

For the same reason, a successful tip-up device should be very sensitive to trigger. Furthermore, once it has been set off, the device should offer no resistance to free paying out of the line.

On windy days the device is often tripped by the wind and false signals are frequently given. The fisherman is then required to reset the tip-up and this is a tedious and cold chore, particularly when a number of tip-ups are used simultaneously.

In accordance with this invention there has been provided a tip-up device which is very sensitive to trigger off. The device can only be triggered by actual movement or paying out of the line. Thus very little tension is required to set off the device and no appreciable resistance is offered in the line when the bait is taken. On the other hand, the construction is such that the wind cannot accidentally trigger the device. Once the signal is given, no frictional resistance is offered by the tip-up but the line is free to run.

The invention also contemplates that the tension required to trigger off the device may be easily varied.

Other objects and advantages of the invention will appear hereinafter, reference being had to the accompanying drawings in which:

Figure 1 is a fragmentary side elevational view of a fishing rod utilizing a tip-up made in accordance with this invention and showing the device in a set position;

Figure 2 is a view similar to Figure 1 but showing the device in the tripped position; and Figure 3 is a perspective view, on an enlarged scale, of the end of the rod as shown in the Figure 1.

Referring in greater detail to the drawings, the fishing rod 10 has an eye 11 at its free end through which the line 12 passes. At the other end of the rod is the reel (not shown) and from which the line is drawn when the bait is hit.

The tip-up device made in accordance with the present invention includes a spring clip type of clamp 14 which yieldingly embraces the rod. The clamp can be opened by compressing the handle portions 18 together and can be slid along the pole in any of a plurality of positions for a purpose that will hereinafter appear.

A flexible spring steel arm 20 is secured as by welding to the forward end of the clamp 14 and in its normal position is substantially straight as shown in Figure 2. This is the triggered position, that is to say the position it assumes after the signal has been set off. A small, brightly colored flag 21 is attached adjacent the free end of the arm so as to make its position readily apparent in spite of poor visibility and from a distance.

The free end of the arm is tapered and terminates in a narrow and slightly concavely curved edge which is on the order of one-eighth of an inch wide. The narrow tapering end will accommodate different size eyes 11 on the various rods with which the tip-up may be used.

As shown in Figure 1, the device is set by bending the free end downwardly and inserting it into the eye 11. The line has been engaged by the edge 22 and the tension of the spring steel tends to urge the arm toward the straight position; however, the eye retains the arm in the cocked position with the line passing under the edge 22.

When a fish takes the bait (not shown) on the end of the line, the latter is pulled slightly outwardly through the eye. This movement causes the flat edge 22 of the arm to be moved generally upwardly and outwardly of the eye where it becomes free of the eye, thus permitting the arm to snap to the straight position. To move the arm end upwardly to thus free it requires very little tension on the line. However, wind is insufficient to cause this arm to be tripped free. Once the arm is free, it no longer offers any resistance whatsoever to line movement.

The line tension which is required to free the captive arm end can be readily varied by adjusting the position of the clamp along the rod. For example, if the clamp is moved to the right on the rod as viewed in Figure 1, the arch formed in the arm is flatter and the friction between the eye and arm is greater and the line tension required to free the end would be greater. If the clamp is moved to the left, the arch is higher and less binding action takes place between the arm and eye and less line tension is then required to trigger the arm. This adjustment can be readily made for the different varieties of fish.

By means of this invention there has been provided a very sensitive tip-up attachment for a conventional fishing rod. Although the action is sensitive, the device cannot be accidently triggered off by the wind but only positive but very slight movement of the line through the eye. The required tripping tension of the line can be quickly and easily adjusted.

Various modes of carrying out the invention are contemplated as being within the scope of the following claim particularly pointing out and distinctly claiming the subject matter which is regarded as the invention.

We claim:

In combination, a relatively stiff fishing rod having a forwardly inclined eye adjacent its free end on one side of the rod, a line passing through said eye, a tip-up signal device including an adjustable clamp secured to said rod on its other side in such a manner that it may be positioned therealong in any one of a plurality of positions adjacent said eye, and a resilient spring steel arm secured to one end to said clamp and extending therefrom in a normally unflexed position at substantially a right angle to said rod, said arm terminating at its outer end in a concavely curved edge, said arm being adapted to be flexed to a cocked position and threaded through said eye in such a manner that the free end portion lies on the back side of the eye and engages the same and a portion of said arm adjacent to but spaced slightly from the edge engages the opposite side of the eye, said line being threaded under the concave edge and through said eye in such a manner that when said line is pulled outwardly through said eye the tendency of the line to straighten lifts said outer end of the arm out of said eye and said arm returns to its normal position.

References Cited in the file of this patent

UNITED STATES PATENTS

| 783,169 | Ball | Feb. 21, 1905 |
| 1,264,000 | Bernhardt | Apr. 23, 1918 |
| 1,995,067 | Killory | Mar. 19, 1935 |
| 2,549,295 | Derby | Apr. 17, 1951 |
| 2,658,299 | Maxfield | Nov. 10, 1953 |